July 19, 1966        E. D. GEORGE ET AL        3,261,893
THERMALLY ADJUSTED CASTING BLADE Filed Oct. 4, 1962                2 Sheets-Sheet 1

INVENTOR.
EVERETT D. GEORGE
BY WILLIAM P. HEYDORN

*J.B.Holden*
ATTORNEY

July 19, 1966  E. D. GEORGE ET AL  3,261,893
THERMALLY ADJUSTED CASTING BLADE
Filed Oct. 4, 1962  2 Sheets-Sheet 2

INVENTOR.
EVERETT D. GEORGE
BY WILLIAM P. HEYDORN

J.B. Holden
ATTORNEY

United States Patent Office 3,261,893
Patented July 19, 1966

3,261,893
THERMALLY ADJUSTED CASTING BLADE
Everett D. George and William P. Heydorn, Cuyahoga Falls, Ohio, assignors to The Goodyear Tire & Rubber Company, Akron, Ohio, a corporation of Ohio
Filed Oct. 4, 1962, Ser. No. 228,477
15 Claims. (Cl. 264—40)

This invention relates to the manufacture of plastic films and particularly to the mechanical apparatus which controls their thickness.

Films such as hydrochlorinated rubber are produced by forming a thin sheet between a revolving drum and a stationary blade, commonly known as a "casting blade." The casting blade is moved into close proximity to a belt running over a drum, or equivalent support thus allowing a thin, continuous film to pass between the casting blade and the belt for further processing. The thickness of the film is largely dependent upon the distance of the casting blade edge from the surface of the belt on the revolving drum. Heretofore, the adjustment of the casting blade with relationship to the belt and drum has been particularly troublesome in that the casting blade had to be manually adjusted by a plurality of set screws.

Other factors which tend to produce variations in the gap between the casting blade edge and belt surface are the concentricity of the drum and its bearings, solvents used, the temperature of adjacent parts, belt thickness and cement flow. Furthermore, the setting of the gap between the casting blade and belt is additionally complicated because the gap distance is not the thickness of the finished film. The material is cast in the order of approximately ten times its final thickness, thus compensating for solvents that are subsequently evaporated.

It is therefore an object of the present invention to provide a control apparatus that will allow automatic adjustment of the gap between the casting blade and the belt on the revolving drum, or equivalent belt support.

It is also an object of the present invention to provide for gap adjustment at any number of locations along the casting blade.

It is a still further object of the present invention to regulate the gap automatically by detecting variations in the thickness of the finished film with a sensor unit such as a beta ray gauge.

It is yet another object of the present invention to utilize a thermally expansionable controller in order to move the casting blade with respect to the revolving drum and belt.

It is an object of the present invention to make adjustment at a number of points along the casting blade without affecting the casting blade at other points.

It is an additional object of the present invention to change the gap between the casting blade and the drum without necessitating a time-consuming and costly shutdown of the production line.

It is another object of the present invention to ultimately allow the production of a thin, continuous film having not only better thickness tolerance with respect to the length but also a more uniform thickness across the width of the film.

These and other objects of the present invention will become more apparent from the following description and drawings in which.

Figure 1:
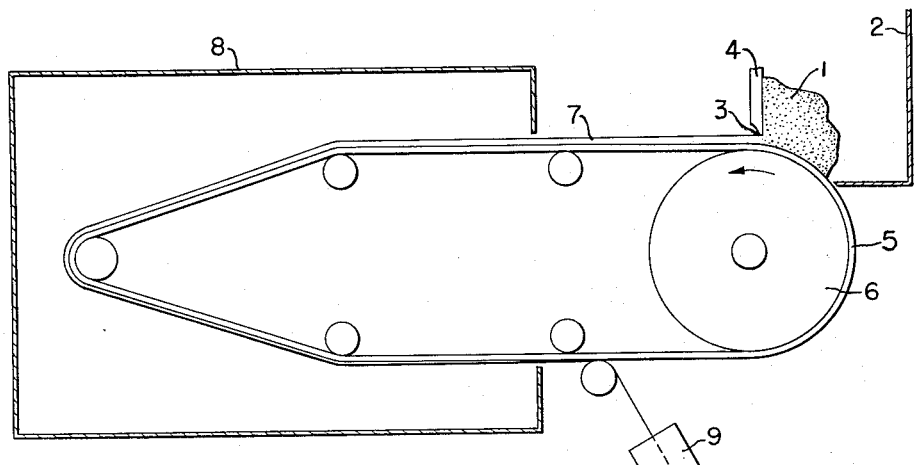
FIG. 1 is a schematic showing a casting blade in conjunction with adjacent apparatus.

As previously discussed in the introduction, the control of a casting blade used in the production of thin films has presented problems in that initial and continuous adjustments were difficult to achieve. It has been found that the present invention improves the accuracy and ease with which casting blade adjustments can be made. Referring to FIG. 1 a schematic showing the typical apparatus is shown. A suitable film compound 1 is placed in hopper 2. The compound is then metered through opening 3 which is formed by casting blade 4 and belt 5 on revolving drum 6, or equivalent support. The film 7 is then conveyed by belt 5 through a drying oven 8 in which the solvents are evaporated. After leaving the drying oven 8, the film 7 is monitored for thickness variations across the entire width in order to insure uniformity of product. In order to effectively monitor the thickness, a gauge such as a multi-stage beta ray gauge is installed as at 9, thus permitting the film thickness to be measured substantially continuously at a plurality of points across the width of the film. When the gauge detects a deviation from the desired film thickness, it will actuate a series of electrical relays that will cause a motorized voltage control such as a variable transformer to function, providing more or less voltage to the controller attached to casting blade 4, thus causing it to raise or lower with respect to the surface of moving belt 5. Since the use of a multistage radiation thickness control gauge is well-known in the art, it will not be discussed herein as to its operational characteristics. After the film has passed through the thickness gauge, it is then rolled for shipment as at 10.

Figure 2:
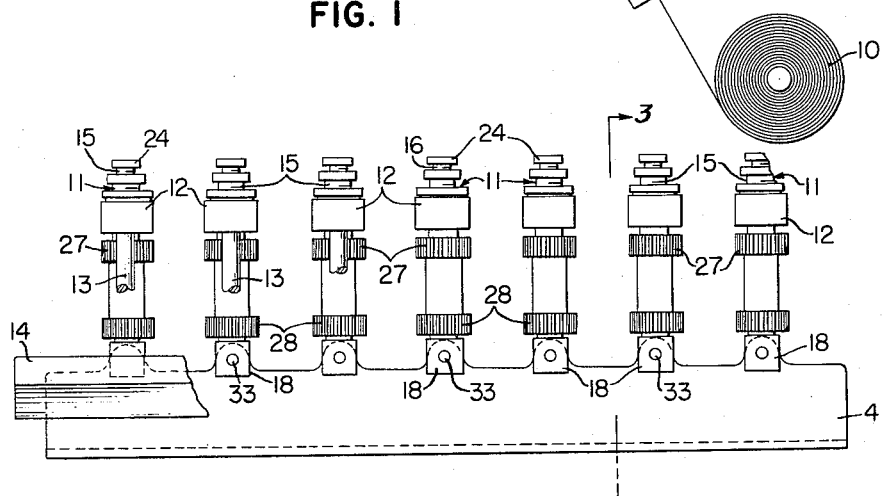
FIG. 2 illustrates a casting blade with attached controllers.
Figure 3:
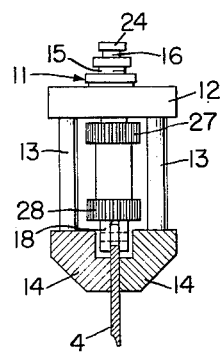
FIG. 3 is a cross section taken along line 3—3 of FIG. 2 which shows the supporting structure for a typical controller.

FIG. 2 shows a plurality of controllers 11 attached to casting blade 4. FIG. 3 shows in detail the yoke support arrangement 12 at the top of each controller 11. The yoke 12 is positioned by rods 13 which are anchored in the blade support structure 14. Rough adjustments can be made by the thread arrangement 15 located at the top of the controller 11. This also permits the initial setting of casting blade 4 in a straight line so that after it is installed on the production film casting unit controllers 11 will not have to move casting blade 4 except for film gauge corrections.

Figure 4:
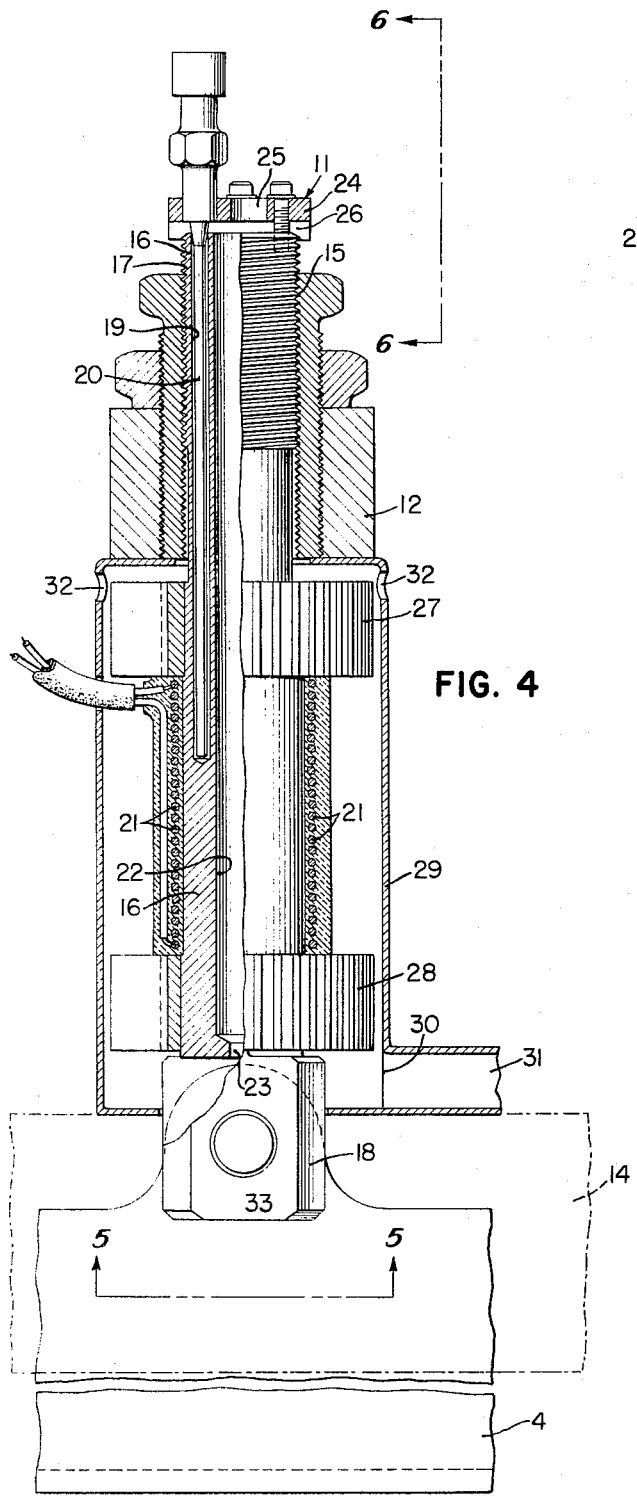
FIG. 4 shows a sectional elevational view of a typical control unit.
Figure 5:
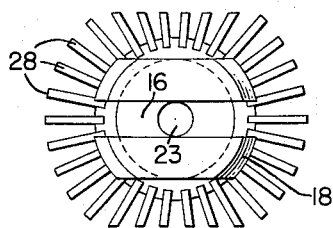
FIG. 5 is a view along section 5—5 of FIG. 4, showing a bottom view of the control unit.
Figure 6:
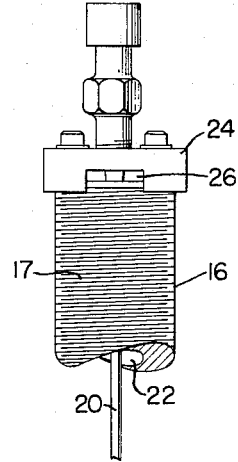
FIG. 6 is a view looking along section 6—6 of FIG. 4.

FIG. 4 shows the various parts which comprise controller 11. The body portion 16 is composed of any suitable material having a positive thermal expansion, such as iron, and is essentially cylindrical with a threaded exterior end 17 for anchorage within the casting blade support structure 14. The end opposite the threaded end has a clevis arrangement 18 for attachment to casting blade 4. The central portion of body 16 contains two cylindrical bores. Bore 19 is blined at one end and terminates such that the end of temperature detector 20 placed therein will be opposite heating coils 21. The larger of the two bores 22 is located in the center of body 16 and terminates at clevis end 18 with an aperture 23 that is of smaller diameter than the diameter of bore 22. The opposite end of bore 22 terminates adjacent end cap 24 which also contains aperture 25 and transverse slot 26. Radially aligned heat dissipating fins 27 and 28 are positioned against body 16 in order to dissipate heat as will be explained hereinafter. The electrical heating coil 21 is placed in a single helix around body 16 and is energized from a conventional power source (not shown). It is not intended to limit the heating means to a single helically wound coil. A plurality of coils could be employed as well as heating elements other than coils. Surrounding the entire central portion of body 11 and part of clevised end 18 is shield 29. Shield 29 has an air inlet 30 from a continuous air supply 31. Air exits 32 are positioned at the opposite end of shield 29 from the air inlet 30. The continuous air supply is advantageous in two ways. First, the moving air aids in heat dissipation from fins 27 and 28. Second, the positive pressure of the flowing air prevents an influx of explosive solvents from entering the confines of the shield. Thus, if a short circuit should occur in coil 21 the ensuing sparks would not come in contact with an explosive mixture which is inherent with the production of this particular type of film.

The controller unit 11 is installed as shown in FIG. 3 by firmly attaching each unit rigidly to framework 14 and the casting blade is attached to the clevised ends by pins 33. A temperature recorder (not shown) is attached to temperature detector 20. As heating coil 21 is energized, body 16 will undergo an increase in temperature and as a result thereof will elongate, thus positioning the tip of casting blade 4 in closer proximity with respect to revolving drum 6 and belt 5. It is also desirable to move casting blade 4 away from drum 6 and belt 5. In addition to the air flow between shield 29 and the exterior of body 16, a stream of air is introduced through aperture 23. The air flows the entire length of bore 22 and exits through aperture 25 and at the outer extremities of slot 26. The air stream also flows over cooling protuberances 27 and 28 which may be in any suitable shape such as fins or concentric rings. The size of the heating coil, diameter of internal bore, amount of exposed fin surface, and air flow are adjusted so that the time required for a given increase in body length equals the time required in order to produce approximately the same amount of contraction.

When manually adjusted control units or jackscrews are attached to the casting blade, they require more "looseness" to permit adjustment and unless each is locked tight after adjustment it can be influenced by other jackscrews along the casting blade. The present invention eliminates the necessity of locking each jackscrew. The thermally expansionable controller will remain locked without "looseness" since it depends upon thermal expansion and contraction to reach the desired length. Thus it can be determined that an adjustment of the casting blade at one location will have little effect upon adjacent jackscrews.

Thus, it can be seen that by using a plurality of control units the entire length or span of the casting blade can be controlled. As thickness gauge 9 detects a portion of the film that is too thick or too thin, an electrical signal can be sent to the appropriate controller, thus regulating the film thickness.

While certain representative embodiments and details have been shown for the purpose of illustrating the invention, it will be apparent to those skilled in this art that various changes and modifications may be made therein without departing from the spirit or scope of the invention.

We claim:

1. A control unit for controlling the movement of a casting blade during the production of a film, the control unit comprising an essentially elongate hollow body portion having attachment means located thereon, electrical heating means adjacent the body portion intermediate the ends thereof, heat dissipation means located adjacent the body portion to facilitate cooling thereof, temperature sensing means adapted to sense the temperature of said body portion, and electrical power source means coupled to the heating means, whereby a flow of electrical current through said electrical heating means will heat the body portion of the control unit, thus producing an elongation and discontinuance of current to the electrical heating means will result in cooling of the body portion and consequently a contraction thereof.

2. A control unit for controlling the linear movement of a casting blade during the production of a film, said control unit comprising an essentially elongate cylindrical hollow body portion having attachment means located thereon, an electrical heating coil adjacent the cylindrical body portion intermediate the ends thereof, heat dissipation protuberances located adjacent the body portion to facilitate the cooling thereof, at least one temperature sensing element located adjacent the heating coil and adapted to sense the temperature of said body portion, and electrical power source means coupled to said heating coil, whereby a flow of electrical current through the heating coil will heat the body portion of the control unit, thus producing an elongation in length and discontinuance of current to the electrical heating means will result in cooling of said body portion and consequently a contraction in length thereof.

3. A control unit for controlling the linear movement of a casting blade during the production of a film, the control unit comprising an essentially elongate cylindrical hollow body portion containing at least one cavity therein, attachment means located on the hollow body, an electrical heating coil wound around the exterior of said hollow body and located intermediate the ends thereof, a plurality of heat dissipation protuberances attached to the hollow body portion to facilitate the cooling thereof, at least one temperature sensing element located within the body and adapted to sense the temperature of said hollow body portion, and electrical power source means coupled to the heating coil, whereby a flow of electrical current through said heating coil will heat the hollow body portion of the control unit, thus producing an elongation in length and discontinuance of current to the electrical heating means will result in cooling of said body portion and consequently a contraction in length thereof.

4. A cotrol unit for controlling the linear movement of a casting blade during the production of a film, the control unit comprising an essentially elongate cylindrical hollow body portion made from material having a positive thermal expansion and containing two cavities therein, thread attaching means located at one end of the hollow body, clevis means located at the end most remote from said threaded end, an electrical heating coil helically wound around the body portion most remote from the ends thereof, a plurality of heat dissipation protuberances formed integrally with the hollow body to provide efficient cooling thereof, at least one temperature sensing element located in one of said body cavities such that it is in parallel relationship with respect to the longitudinal axis of the control unit and adapted to sense the temperature of the hollow body portion, and electrical power source means coupled to said helically wound coil, whereby a flow of electrical current through the helically wound coil will raise the temperature of the body portion of the control unit, thus producing a desired elongation in length and discontinuance of current to the helically wound heating coil will result in cooling of the body portion and consequently a contraction in length thereof.

5. A control unit for controlling the linear movement of a casting blade during the production of a continuous film, the control unit comprising an essentially elongate cylindrical hollow body portion made from material having a positive thermal expansion and containing two cylindrical cavities therein one of which is symmetrically located about the longitudinal axis of control unit, thread attaching means externally located at one end of the hollow body, clevis means containing a bore located at the end most remote from the externally threaded end, an electrical heating coil helically wound in a single layer coil around the body portion most remote from the ends thereof, a plurality of heat dissipation means formed integrally with and encompassing the control unit body, the exterior surface of said means extending radially into a plurality of circumferentially spaced protuberances having parallel sides and terminating such that the ends thereof form an annular configuration thus providing efficient cooling of the control unit, at least one temperature sensing element located in one of the body cavities such that it is in parallel relationship with respect to the longitudinal axis of the control unit and the point thereof terminates in the area of the helically wound coil, the sensing element adapted to sense the temperature of said hollow body portion, and electrical power source means coupled to the helically wound coil, whereby a flow of electrical current through the helically wound coil will raise the temperature of the body portion of the control unit, thus producing a desired elongation in length and discontinuance of current to said helically wound coil will result in cooling of said body portion and consequently a contraction in length thereof.

6. A control unit as set forth in claim 1 wherein the body portion of said unit is enclosed in a cylindrical shield containing air ingress means and an air exhaust means.

7. A control unit as set forth in claim 6 wherein the cylindrical cavity located on the longitudinal axis thereof has an opening on the end adjacent the clevis and the end most remote said clevis end is closed by an end plate containing a transverse groove that is in communication with one of said cylindrical cavities.

8. In combination, a casting blade and a plurality of control units mounted contiguous said casting blade and connected thereto such that the blade can be adjusted with respect to the surface of a drum, said casting blade comprised of an elongate bar containing mounting means for attachment of said control units; each of said control units comprising an elongate body having mounted centrally thereto a heating element capable of receiving a flow of current for raising the temperature of said elongate body thus resulting in an elongation in said control unit, whereby the casting blade is moved with respect to said drum, and heat dissipation means located remote from the ends of the elongate body in order to facilitate cooling when the current is discontinued.

9. In combination, a casting blade and a plurality of control units mounted adjacent each other along said casting blade and connected thereto such that the blade edge can be adjusted with respect to the surface of a revolving drum, said casting blade comprised of an elongate bar containing mounting means along one edge thereof for attachment to said control units, said control units comprising an elongate cylindrical body having mounted centrally thereof a heating element for producing elongation in said control unit whereby the casting blade is moved in closer proximity with respect to the surface of the revolving drum, cooling means located remote from the cylindrical body and in intimate contact therewith and a temperature sensor located so that the body thereof is contained within the control unit thus providing a way of determining the heat buildup within the cylindrical body.

10. In combination, a casting blade and a plurality of control units mounted equidistant from each other along said casting blade and connected thereto such that any section of the blade edge can be adjusted with respect to the surface of a revolving drum, said casting blade comprised of a continuous elongate bar containing mounting means along one edge thereof for attachment to said control units, said control units comprising an elongate cylindrical body having mounted centrally thereof a heating element for producing elongation in said control unit whereby the casting blade is moved in closer proximity with respect to the surface of the revolving drum, cooling protuberances remote from the ends of the cylindrical body and in intimate contact therewith, a temperature sensor located so that the body thereof is in parallel relationship with respect to the longitudinal axis of the control unit and the tip of the indicator is positioned between the heating element and the longitudinal axis of the control unit.

11. The combination of claim 10 including a film thickness indicator such that a deviation from the required film thickness will be detected by the indicator which in turn will actuate relays that will cause a motorized voltage control unit to function providing a variable voltage to the control units attached to the casting blade thus causing it to move closer to or away from the moving belt and drum.

12. The combination of claim 10 in which the control units are surrounded by shields so that a continuous air stream can be utilized to prevent an explosive mixture from contacting the heating coils.

13. The combination of claim 12 wherein the control unit body contains a cylindrical bore such that air can pass freely therethrough and a heating coil formed from resistance wire wound around the control unit body in a helical coil.

14. The method of automatically adjusting a belt and casting blade used in forming a thin film in conjunction with a revolving drum comprising the steps of detecting film thickness variations with a thickness gauge, conveying the thickness variations in the form of an electrical signal to a plurality of control units, heating the control units by an electrical means to a predetermined temperature as indicated by temperature sensing means, causing an elongation in the body portion of the control unit, thereby moving a portion of the casting blade in closer proximity with respect to the drum surface should the thickness gauge indicate a thick film and directing an airstream around and through the heat dissipation protuberances of the control unit, to cause a contraction in the body portion of the control unit, when the electrical voltage means is inactivated, thereby moving a portion of the casting blade away from the drum surface when the film is too thin.

15. The control unit as set forth in claim 7 wherein the surface provided by the heat dissipation means will permit a heat loss at approximately the same rate as the heat input of the electrical heating coil, so that the time required for an incremental elongation equals the time required for a contraction through the same incremental distance.

References Cited by the Examiner
UNITED STATES PATENTS

| | | | |
|---|---|---|---|
| 1,921,953 | 8/1933 | Stephens | 18—15 |
| 2,576,317 | 11/1951 | Toulmin | 18—15 |
| 2,718,661 | 9/1955 | Russell | 18—15 |
| 2,762,077 | 9/1956 | Marlsowitz | 18—15 X |
| 2,775,257 | 12/1956 | Stirn et al. | 18—15 X |
| 2,842,797 | 7/1958 | Scherer | 18—15 |
| 2,936,492 | 5/1960 | Swerlick et al. | 18—57 |
| 3,048,895 | 8/1962 | Bottomley | 18—57 |
| 3,071,810 | 1/1963 | LaForge | 18—15 |
| 3,122,784 | 3/1964 | Jolliffe | 18—2 |

WILLIAM J. STEPHENSON, *Primary Examiner.*

ALEXANDER H. BRODMERKEL, *Examiner.*

C. B. HAMBURG, *Assistant Examiner.*